United States Patent [19]

Wolfe, Jr.

[11] 4,094,857
[45] June 13, 1978

[54] COPOLYMERIZABLE PHENOLIC ANTIOXIDANT

[75] Inventor: James Richard Wolfe, Jr., Wilmington, Del.

[73] Assignee: E. I. Du Pont de Nemours and Company, Wilmington, Del.

[21] Appl. No.: 829,822

[22] Filed: Sep. 1, 1977

[51] Int. Cl.$^2$ .............. C08K 5/20; C07D 307/89; C07D 307/93; C07C 101/42
[52] U.S. Cl. .............. 260/45.9 QB; 260/47 CP; 260/45.8 A; 260/45.85 N; 260/519; 260/346.6; 260/346.7; 260/45.9 QB; 260/45.95 R; 560/39; 560/44
[58] Field of Search .............. 260/45.8 A, 45.85 N, 260/519, 346.6, 346.7, 75 N, 45.9 QB, 45.95 R, 47 CP; 560/39, 44

[56] References Cited

U.S. PATENT DOCUMENTS

| 2,207,063 | 7/1940 | Liston | 560/44 |
|---|---|---|---|
| 2,324,712 | 7/1943 | Lynch | 560/44 |
| 3,213,065 | 10/1965 | Bunge et al. | 260/75 N |
| 3,376,258 | 4/1968 | Gysling et al. | 260/75 N |
| 3,488,737 | 1/1970 | Gordon | 260/519 |
| 3,856,753 | 12/1974 | Henry et al. | 260/75 N |
| 3,896,078 | 7/1975 | Hoeschele | 260/75 N |
| 4,051,196 | 9/1977 | Wells et al. | 260/75 N |

OTHER PUBLICATIONS

Polymer Preprints-vol. 18, No. 1, Mar. 1977-pp. 542-546; Papers Presented at New Orleans Meeting, Div. of Polymer Chemistry Inc., American Chemical Society.

*Primary Examiner*—V. P. Hoke

[57] ABSTRACT

An antioxidant useful for stabilizing polyesters having the formula

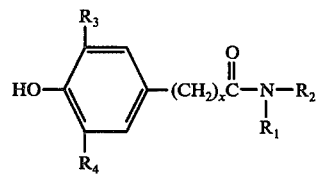

where $R_1$ is hydrogen or a lower alkyl radical; $R_2$ is a monovalent radical containing carbon, hydrogen, and oxygen, free of ethylenic or acetylenic unsaturation, and having a molecular weight between about 99-300 and, further, containing two carboxyl groups or their ester forming equivalents; $R_3$ and $R_4$ are tertiary alkyl radicals each containing not more than 8 carbon atoms; and $x$ is an integer of from 0-4.

29 Claims, No Drawings

COPOLYMERIZABLE PHENOLIC ANTIOXIDANT

BACKGROUND OF THE INVENTION

This invention relates to novel copolymerizable phenolic antioxidants, copolyetheresters stabilized with said antioxidants, and a method for preparing such stabilized copolyetheresters.

Copolyetheresters undergo degradation upon being exposed to air at elevated temperatures due to oxidative and thermal decomposition of the polymer. This severely limits the use of copolyetheresters for many applications unless they are stabilized against degradation. A multitude of stabilizers that impart oxidative stability to copolyetheresters have been suggested. However, most stabilizers used have not been entirely satisfactory and many have rather serious defects. For example, there are two primary classes of antioxidants used for stabilzing copolyetheresters: arylamine antioxidants and hindered phenols. Arylamine antioxidants cause severe staining of materials in contact with the stabilized copolyetherester. Hindered phenolic stabilizers have been used with more success, but at concentrations where they provide reasonable protection, they often exceed their solubility limit, migrate to the surface and form unsightly bloom. Arylamine antioxidants and hindered phenols can be leached from the polymer or volatilized which, of course, in either event, results in loss of effectiveness of the stabilizer. Thus, there is a need for stabilizers that effectively prevent oxidative decomposition of copolyetheresters, without the problems of prior art stabilizers.

SUMMARY OF THE INVENTION

The present invention involves the discovery of novel copolymerizable phenolic antioxidants, stabilized copolyetheresters containing the antioxidants, and a process for making the stabilized copolyetherester compositions. More specifically, this invention is directed to novel copolymerizable phenolic antioxidants that have the structural formula:

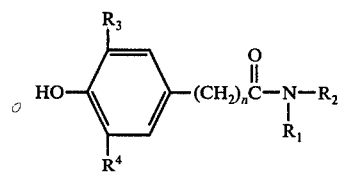

(I)

wherein $R_1$ is hydrogen or a lower alkyl radical, usually containing 1-8 carbon atoms, preferably, hydrogen; $R_2$ is a monovalent radical containing carbon, hydrogen, and oxygen, free of ethylenic or acetylenic unsaturation, and having a molecular weight between about 99-300 and, further, containing two carboxyl groups or their ester-forming equivalents, preferably two carboalkoxy groups; $R_3$ and $R_4$ are tertiary alkyl radicals each containing not more than 8 carbon atoms, preferably 4; and $x$ is an integer of from 0-4, preferably 2. In determining the molecular weight of $R_2$, atoms added in ester-forming equivalents such as the alkyl group in an ester of a carboxyl group are not counted.

The present invention also provides a method for making stabilized copolyetherester compositions by reacting a poly(alkylene oxide) glycol, a dicarboxylic acid and a diol in the presence of an effective amount of antioxidant units derived from a compound of formula I above. The copolymerizable antioxidant is added before or during polymerization, usually during monomer addition, so that the copolymerizable phenolic antioxidant enters into the polymerization reaction. Units derived from the antioxidant go into the backbone of the copolyetherester and they are connected to ester units in the copolyetherester through ester linkages. This results in a stablized copolyetherester composition in which antioxidant is immobilized in a polymer that consists essentially of a multiplicity of recurring long chain ester units and short chain ester units joined head-to-tail through ester linkages, said long chain ester units being represented by the formula

(II)

and said short chain ester units being represented by the formula

(III)

where G is a divalent radical remaining after the removal of terminal hydroxyl groups from a poly(alkylene oxide) glycol having a number average molecular weight of about 400-6000 and a carbon to oxygen atomic ratio of about 2.0-4.3; R is a divalent radical remaining after removal of carboxyl groups from a dicarboxylic acid having a molecular weight less than about 300, and D is a divalent radical remaining after removal of hydroxyl groups from a diol having a molecular weight less than about 250; provided said short chain ester units amount to about 15-95 percent by weight of said copolyetherester and characterized in that said copolyetherester is stabilized against oxidative degradation due to the presence in the backbone of the copolyetherester of an effective concentration of units derived from:

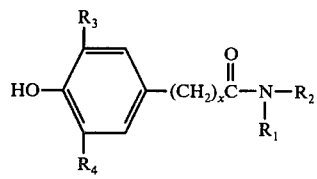

where $R_1$ is hydrogen or a lower alkyl radical, usually containing 1-8 carbon atoms, preferably, hydrogen; $R_2$ is a monovalent radical containing carbon, hydrogen, and oxygen, free of ethylenic or acetylenic unsaturation, and having a molecular weight between about 99-300 and, further, containing two carboxyl groups or their ester-forming equivalents; $R_3$ and $R_4$ are tertiary alkyl radicals each containing not more than 8 carbon atoms; and $x$ in an integer of from 0-4, said units being connected to ester units in the copolyetherester through ester linkages.

DETAILED DESCRIPTION OF THE INVENTION

The novel copolymerizable hindered phenolic antioxidants of the present invention represented hereinabove as formula I contain carboxyl groups or their ester-forming equivalents that permit incorporation of the stabilizer into the copolyetherester backbone through ester linkages. The substituents provided by $R_2$ are those that react with the ester groups in the copolyetherester to permit incorporation of structural units derived from the copolymerizable phenolic antioxidant in the copolyetherester. $R_1$ in formula I is preferably hydrogen but can be an alkyl radical generally containing 1–8 carbon atoms, and usually is $-CH_3$, $-CH_2-CH_3$ or $-CH_2-CH_2-CH_3$. $R_2$ is a monovalent radical containing carbon, hydrogen, and oxygen, free of ethylenic or acetylenic unsaturation, and having a molecular weight between 99–300. The functional groups contained in $R_2$ can be two carboxyl groups or ester-forming equivalents such as two carboalkoxy groups or a cyclic anhydride; $R_2$ radicals containing two carboalkoxy groups are preferred because they generally undergo ester interchange rapidly and cleanly. Generally, the alkoxy group contains not more than 10 carbon atoms, preferably 1–4 carbon atoms. As previously indicated, in determining the molecular weight of $R_2$, additional atoms introduced in forming ester-forming equivalents are not to be counted. Representative $R_2$ radicals include:

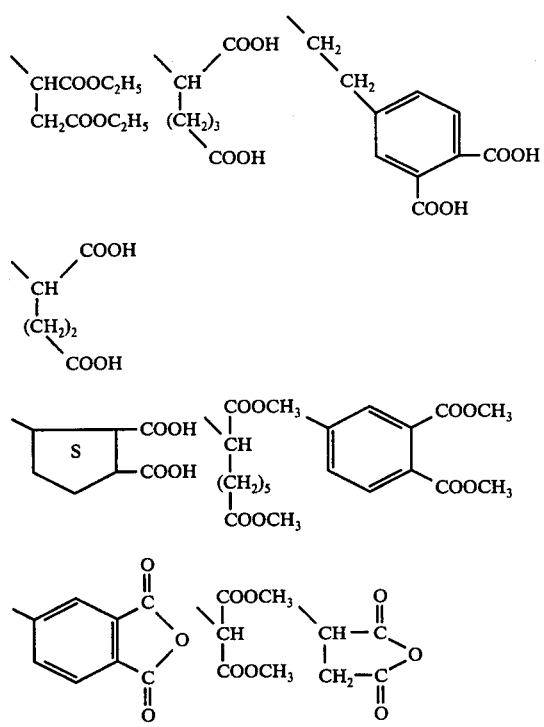

Preferred $R_2$ radicals are

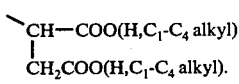

The $R_2$ radical contains at least 3, and, generally, not more than 16 carbon atoms, and preferably not more than 10 carbon atoms. Antioxidants wherein the carbon atom in $R_2$ which is linked to the amide nitrogen is saturated (that is, not aromatic) are especially preferred because they are the most non-discoloring.

$R_3$ and $R_4$ are tertiary alkyl groups each containing not more than 8 carbon atoms such as tert.-amyl, tert.- octyl and $\alpha$-methylcyclohexyl. Preferably, both $R_3$ and $R_4$ are tert.-butyl.

Antioxidants having 1 to 4 methylene groups ($x=1-4$) between the hindered phenolic radical and the amide linkage in formula I above are also preferred because they show the greatest antioxidant activity. For example, stabilizers derived from 3,5-di-tert-butyl-4-hydroxyhydrocinnamic acid ($x=2$) are especially preferred.

Some of the antioxidants in which the $R_2$ radical is linked by an aromatic carbon to the amide nitrogen when incorporated in copolyetheresters may show some discoloration as the antioxidant is consumed. Of course, even those antioxidants which may discolor because of the aromatic substitution on the nitrogen do not stain because of their lack of mobility in the polymer being stabilized.

Generally, about 0.2–10% by weight of the copolymerizable antioxidant, based on the weight of the copolyetherester, is added to and incorporated in the polymer.

The following compounds are representative of the copolymerizable antioxidants of this invention.

4-(3,5-di-tert.-butyl-4-hydroxybenzamido)phthalic anhydride dimethyl 5-(3,5-di-tert.-butyl-4-hydroxybenzamido)-isophthalate diethyl $\alpha$-(3,5-di-tert.-butyl-4-hydroxyhydrocinnamido)-succinate dimethyl 5-(3,5-di-tert.-butyl-4-hydroxyhydrocinnamido)-isophthalate diethyl $\alpha$-(3,5-di-$\alpha$-methylcyclohexyl-4-hydroxyhydrocinnamido)succinate 4-[$\gamma$-(3,5-di-tert.-butyl-4-hydroxyphenyl)-butyramido]phthalic anhydride dibutyl $\alpha$-(N-methyl-3,5-di-tert.-butyl-4-hydroxyhydrocinnamido)succinate $\alpha$-(3,5-di-tert.-butyl-4-hydroxyhydrocinnamido)adipic acid.

The novel copolymerizable antioxidants are prepared by conventional synthetic methods. A preferred route involves converting the acid

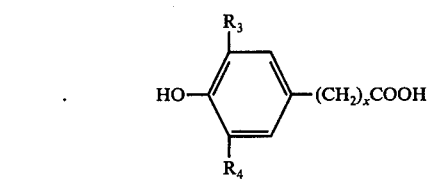

(wherein $R_3$, $R_4$ and x have the same meanings as those given above) to its acid chloride which, in turn, is reacted with a suitable primary or secondary amine

wherein $R_1$ and $R_2$ have the same meanings as given hereinbefore. The acids are known compounds and the formation of the acid chlorides and their reaction with the amine derivatives are also known and described in U.S. Pat. No. 3,294,836 to Peterson et al., the disclosure of which is incorporated herein by reference, and their preparation is exemplified hereinafter in detail in the examples.

Antioxidants derived from primary amines

are preferred because the resulting amides are more effective stabilizers, presumably because they are able to interact with aldehydes formed in the early stages of oxidative degradation.

A preferred embodiment of the present invention involves the use of conventional unpolymerizable antioxidants, such as those of the arylamine type or the hindered phenol type, in amounts up to about 5% by weight of the copolyetherester, e.g., 0.1-5.0% by weight in addition to the copolymerizable phenolic antioxidant represented above by formula I. The use of the combination of polymerizable and unpolymerizable antioxidants provides excellent protection but it is obvious that one must limit the quantity of unpolymerizable antioxidants to avoid or minimize problems such as staining or blooming.

Representative unpolymerizable arylamine antioxidants that can be used in combination with the copolymerizable phenolic antioxidants include:

Diarylamines such as phenyl naphthylamines, octylated diphenylamine, 4,4'-dimethoxydiphenylamines, 4,4'-bis(α,α-dimethylbenzyl)diphenylamine and 4-isopropoxydiphenylamine;

p-Phenylenediamine derivatives such as N,N'-bis-1-methylheptyl-p-phenylenediamine, N,N'-di-beta-naphthyl-p-phenylenediamine, N,N'-diphenyl-p-phenylenediamine, N-cyclohexyl-N'-phenyl-p-phenylenediamine, and N-sec-butyl-N'-phenyl-p-phenylenediamine; and Ketone aldehyde amine condensates such as polymerized 1,2-dihydro-2,2,4-trimethylquinoline, 6-ethoxy-1,2-dihydro-2,2,4-trimethylquinoline, diphenylamine-acetone condensation products, N-phenyl-β-naphthylamine-acetone condensation products, butyraldehyde-aniline condensation products and aldol-α-naphthylamine.

Representative conventional unpolymerizable hindered phenol antioxidants that can be used in combination with the copolymerizable antioxidants include:

Monohydric phenols such as 2,6-di-tert-butyl-4-methylphenol, butylated p-phenyl-phenol and 2-(α-methylcyclohexyl)-4,6-dimethylphenol;

Bis-phenols such as 2,2'-methylenebis-(6-tert-butyl-4-methylphenol), 4,4'-bis(2,6-di-tert-butylphenol), 4,4'-methylenebis(6-tert-butyl-2-methylphenol), 4,4'-butylene-bis(6-tert-butyl-3-methylphenol), 4,4'-methylenebis(2,6-di-tert-butylphenol), 4,4'-thiobis(6-tert-butyl-2-methylphenol), and 2,2'-thiobis(4-methyl-6-tert-butylphenol);

Tris-phenols such as 1,3,5-tris(3,5-di-tert-butyl-4-hydroxyhydrocinnamoyl)-hexahydro-s-triazine, 1,3,5-trimethyl-2,4,6-tris(3,5-di-tert-butyl-4-hydroxybenzyl)-benzene and tri(3,5-di-tert-butyl-4-hydroxyphenyl)-phosphite; and Amide-containing phenolic antioxidants such as those described in U.S. Pat. No. 3,584,047 to Dexter et al.

The term "long-chain ester units" as applied to units in a polymer chain of the copolyetherester that is stabilized refers to the reaction product of a long-chain glycol with a dicarboxylic acid. Such "long-chain ester units", which are a repeating unit in the copolyetheresters, correspond to formula (II) above. The long-chain glycols are polymeric glycols having terminal (or as nearly terminal as possible) hydroxy groups and a molecular weight from about 400-6000. The long-chain glycols used to prepare the copolyetheresters are poly(alkylene oxide) glycols having a carbon-to-oxygen atomic ratio of about 2.0-4.3.

The term "short-chain ester units" as applied to units in a polymer chain of the copolyetherester that is stabilized refers to low molecular weight chain units having molecular weights less than about 550. They are made by reacting a low molecular weight diol (below about 250) with a dicarboxylic acid having a molecular weight below about 300, to form ester units represented by formula (III) above.

The term "low molecular weight diols" as used herein should be construed to include such equivalent esterforming derivatives; provided, however, that the molecular weight requirement pertains to the diol only and not to its derivatives.

The term "dicarboxylic acids" as used herein, includes equivalents of dicarboxylic acids having two functional carboxyl groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative.

Aromatic dicarboxylic acids are a preferred class for preparing the copolyetherester polymers that are stabilized. Among the aromatic acids, those with 8-16 carbon atoms are preferred, particularly the phenylene dicarboxylic acids, i.e., phthalic, terephthalic and isophthalic acids and their dimethyl esters.

The short-chain ester units will constitute about 15-95 weight percent of the copolyetherester. The remainder of the copolyetherester will be long-chain ester units comprising about 5-85 weight percent of the copolyetherester.

Preferred copolyetheresters which are stabilized by the addition of the copolymerizable antioxidant are those prepared from dimethyl terephthalate, 1,4-butanediol, and poly(tetramethylene oxide) glycol having a molecular weight of about 600-2000. Optionally, up to about 30 mole % of the dimethyl terephthalate in these polymers can be replaced by dimethyl phthalate or dimethyl isophthalate.

The dicarboxylic acids or their derivatives and the polymeric glycol are incorporated into the copolyetherester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

The stabilized copolyetheresters described herein are made by a conventional ester interchange reaction which takes place in the presence of the copolymerizable antioxidant and during said reaction the antioxidant is incorporated substantially quantitatively into the polymer backbone.

A preferred procedure involves heating the dimethyl ester of terephthalic acid with a long-chain glycol and a molar excess of 1,4-butanediol and a quantity of copolymerizable antioxidant sufficient to provide about 0.2–10 weight % in the product in the presence of a catalyst at about 150°–260° C and a pressure of 0.05 to 0.5 MPa, preferably ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyetherester by distillation of the excess of short-chain diol. The second process stage is known as "polycondensation".

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200°–280° C, preferably about 220°–260° C, for less than about two hours, e.g., about 0.5 to 1.5 hours. The antioxidant can be introduced at any stage of copolyetherester formation as long as polymerization is still in progress. Preferably, the antioxidant is added with the monomers in the prepolymer stage. It is customary to employ a catalyst while carrying out ester interchange reactions. While a wide variety of catalysts can be employed, organic titanates such as tetrabutyl used alone or in combination with magnesium or calcium acetates are preferred. The catalyst should be present in the amount of about 0.005 to 2.0 percent by weight based on total reactants.

Both batch and continuous methods can be used for any stage of copolyetherester polymer preparaton. Polycondensation of prepolymer already containing the copolymerizable antioxidant can also be accomplished in the solid phase by heating divided solid prepolymer in a vacuum or in a stream of inert gas to remove liberated low molecular weight diol. This method has the advantage of reducing thermal degradation because it must be used at temperatures below the softening point of the prepolymer.

A detailed description of suitable copolyetheresters that can be stabilized by the novel copolymerizable phenolic antioxidant and procedures for their preparation are described in U.S. Pat. Nos. 3,023,192, 3,651,014, 3,763,109, and 3,766,146, the disclosures of which are incorporated herein by reference.

It is preferred that an antioxidant, either conventional and/or one of this invention, be present at any point in the process where the poly(alkylene oxide) glycol is exposed to elevated temperatures, e.g., above about 100° C.

When a copolymerizable antioxidant is employed alone it prevents oxidative degradation of the reactants and the polymer as it is being formed. The antioxidant does not interfere with transesterification or deactivate the transesterification catalysts. In the finished copolyetherester, the presence of the antioxidant maintains the physical properties of the polymer at a high level during use at elevated temperatures. For increased resistance to ultraviolet degradation, a UV screening agent (such as a suitably substituted benzophenone or benzotriazole) can be incorporated in addition to the antioxidant.

Since the preferred stabilized compositions do not discolor significantly, it permits their use in white and light colored stocks.

The high stability of the stabilized compositions of this invention, which is found even above the melting point of the copolyetheresters, is advantageous in molding and extruding operations, fiber spinning, hot melt adhesive techniques, calendering and laminating procedures and similar operations. Such procedures require that the copolyetheresters, be maintained at temperatures above their melting points for varying lengths of time.

The copolymerizable antioxidant is superior in several respects to other antioxidants used with copolyetheresters. In general, other antioxidants have one or more of the following deficiencies: interference with the polycondensation, limited compatibility with the copolyetherester, i.e., "blooming", too volatile to be retained in the polycondensation, develop unpleasant odors, and can be extracted from the polymer by fluids in contact with polymer. Aromatic amine antioxidants, generally, as a class cause staining of materials in contact with the stabilized polymer.

The properties of these stabilized copolyetheresters can also be modified by incorporation of various conventional inorganic fillers, such as carbon black, silica gel, alumina, rutile, clays and chopped fiber glass. White or light colored fillers are preferred with the nondiscoloring compositions of this invention. In general, these additives have the effect of increasing the modulus of the material at various elongations.

while the description of the use of the novel antioxidants has been directed hereinbefore in relation to copolyetheresters, it is obvious that the antioxidants can be used in linear polyesters, branched and cross-linked polyesters, polyester amides and other condensation polymers wherein the reactive groups of the antioxidant permit incorporation into the polymer backbone. The antioxidants can be used in polyamides. By incorporating a relatively high concentration of antioxidant in a suitable condensation polymer, one can stabilize any other polymer with which the concentrate can be blended. For example, the antioxidant can be incorporated in a copolyetherester which is turn is blended with a polyacetal.

The following examples further illustrate the invention. All parts, proportions and percentages disclosed herein are by weight unless otherwise indicated.

EXAMPLES

Part I: Preparation of Copolymerizable Antioxidants

Example 1 - Additive A

Dimethyl 5-(3,5-di-tert.-butyl-4-hydroxybenzamido)-isophthalate — 3,4-di-tert.-butyl-4-hydroxybenzoic acid was converted to the acid chloride by reaction with excess thionyl chloride in chloroform. Equimolar amounts of 3,5-di-tert.-butyl-4-hydroxybenzoyl chloride and dimethyl 5-aminoisophthalate were allowed to react in ethyl ether followed by the addition of a 40% molar excess of triethylamine. Following a 70 minute reflux a solid product was recovered. The solid product was washed with ethyl ether, 7% hydrochloric acid, and then water until neutral. It was dried. Recrystallization from benzene gave white powdery crystals having a melting range of 206°–208° C (uncorr.) and a severely depressed mixed melting point with 3,5-di-tert.-butyl-4-hydroxybenzoic acid.

Analysis — Calculated for $C_{25}H_{31}NO_6$: C, 68.0%; H, 7.1%; N, 3.2%; O, 21.7%; mol. wt. 442. Found: C, 68.3%; H, 7.2%; N, 3.1%, O 21.1%; mol wt. by VPO 452.

Dimethyl 5-(3,5-di-tert.-butyl-4-hydroxybenzamido)-isophthalate is coded in Table I and II as additive A.

Example 2 - Additive B

Diethyl α-(3,5-di-tert.-butyl-4-hydroxyhydrocinnamido)succinate — 3,5-di-tert.-butyl-4- hydroxyhydrocinnamoyl chloride was allowed to react with an equimolar amount of diethyl DL-aspartate at room temperature in ether solution followed by the addition of a 40% molar excess of triethylamine. The reaction mixture was heated at reflux for 2 hours, cooled, diluted with ethyl ether, washed twice in 7% hydrochloric acid, washed several times with water until almost neutral, and then dried over anhydrous sodium carbonate. Filtration to remove the drying agent followed by rotary evaporation to remove the solvent left a viscous yellow oil, portions of which were induced to crystallize with the aid of petroleum ether and ethyl ether. After recrystallization from petroleum ether/ethyl ether mixtures, white crystals were obtained having a melting range of 77°–79° C (uncorr.).

Analysis—Calculated for $C_{25}H_{39}NO_6$: C, 66.8%; H, 8.7%; N, 3.1%; mol. wt. 450. Found C, 67.3%; H, 8.9%; N 3.1%; mol. wt. by VPO 457.

Diethyl α-(3,5-di-tert.-butyl-4-hydroxyhydrocinnamido)succinate is coded as Additive B in Tables I and II.

Example 3 - Additive C

Dimethyl 5-(3,5-di-tert.-butyl-4-hydroxyhydrocinnamido)isophthalate — Equimolar amounts of 3,5-di-tert.-butyl-4-hydroxyhydrocinnamoyl chloride and dimethyl 5-aminoisophthalate were allowed to react in ethyl ether followed by the addition of a 40% molar excess of triethylamine. Following a 1-½ hour reflux a solid product was recovered, washed, and dried. The product was recrystallized from benzene to yield white crystals having a melting range of 188°–191° C (uncorr.)

Analysis—Calculated for $C_{27}H_{35}NO_6$: C, 69.1%, H, 7.5%; N, 3.0%; mol. wt. 470. Found C, 68.9%; H, 7.6%; N, 3.0%; mol. wt. by VPO 458.

Dimethyl 5-(3,5-di-tert.-butyl-4-hydroxyhydrocinnamido)isophthalate is coded as Additive C in Tables I and II.

Part II: Copolymer Syntheses

The following procedures yield unstabilized copolyetheresters that serve as controls in the examples. Stabilized copolyetheresters are prepared by the same procedures with the exception that the antioxidants are added along with the other starting materials.

Copolymer 1

The following materials were placed in a 400 ml fluorocarbon resin lined reaction flask fitted for distillation:

| | |
|---|---|
| dimethyl terephthalate | 32.8 gm |
| 1,4-butanediol | 20.1 gm |
| poly(tetramethylene ether) glycol; number average molecular weight about 976 | 19.6 gm |

A stainless steel stirrer with a paddle cut to conform with the internal radius of the flask and with a circular baffle 13 mm less in diameter than the inside of the flask was positioned with the paddle at the bottom of the flask and the baffle 64 mm above the bottom of the flask. Air in the flask was replaced with nitrogen. The flask was placed in an oil bath at 160° C. After the reaction mixture liquified, 0.8 ml of catalyst solution* was added and agitation was initiated. Methanol distilled from the reaction mixture as the temperature of the oil bath was slowly raised to 250° C over a period of about one hour. When the temperature reached 250° C, the pressure was gradually reduced to 13 Pa or less over a period of about 50 minutes. The polymerization mass was agitated at 250°–254° C/8-13 Pa for about 2 hours. The resulting viscous molten product was scraped from the flask in a nitrogen (water and oxygen free) atmosphere and allowed to cool. From the ratios of starting materials the copolymer was calculated to contain 59.6% (wt) tetramethylene terephthalate/40.4% (wt) poly(tetramethylene ether) terephthalate. The copolymer had an inherent viscosity of 1.88 dl/gm in m-cresol at 30° C. This copolymer is coded as Copolymer 1.

* The catalyst solution was prepared by mixing 30 ml of tetrabutyl titanate with 570 ml of distilled 1,4-butanediol. A cloudy suspension formed which gradually turned to a clear solution during several days' stirring.

COPOLYMER 2

Employing the same procedure for the synthesis of Copolymer 1, the following materials were reacted to form Copolymer 2:

| | |
|---|---|
| dimethyl terephthalate | 36.4 gm |
| dimethyl phthalate | |
| 1,4-butanediol | 26.4 gm |
| poly(tetramethylene ether) glycol; number average molecular weight about 976 | 10.6 gm |
| catalyst solution | 0.8 ml |

From the ratios of staring materials Copolymer 2 was calculated to contain 71% (wt) tetramethylene terephthalate/7.0% (wt) tetramethylene phthalate/20% (wt) poly(tetramethylene ether) terephthalate/2.0% (wt) poly(tetramethylene ether) phthalate. Copolymer 2 had an inherent viscosity of 1.53 dl/gm in m-cresol at 30° C.

Part III: Stabilization of Copolymers by Copolymerizable Antioxidants

Examples 4–20 and Controls

Stabilized copolymers were prepared by adding varying amounts of the antioxidants to the starting monomer mixtures listed for Copolymers 1 and 2 to provide the desired weight percent of antioxidant in the product. The copolyetheresters were compression molded at 232° C for Copolymer 1 and at 249° C for Copolymer 2 into 1.27 mm slabs. Dumbbell shaped specimens 114.3 mm long were died out of the slabs and heat aged at 150° C in 305 mm long by 38 mm diameter test tubes. Two dumbbells of each sample were suspended on a wire attached to an aluminum foil coated asbestos stopper inserted into the mouth of the test tube. Inserted into the stopper were two 8mm O.D. glass tubes of length 380 mm. One tube was inserted so as to be near the bottom of the test tube and the other was inserted about 102 mm into the test tube. The test tube portions of the assemblies were totally immersed in a multicavity aluminum block held at 150° C. The condition of the dumbbells was checked every 24 hours. If unbroken, one dumbbell was removed, cooled to room temperature, and then bent so as to bring together the inside opposite ends without pinching the loop in the middle. This is the 180° bend test. Failure occurrred if the dumbbell specimen broke during the 180° bend test or if the dumbbell broke in the heat aging tube prior to the bend test. If the first dumbbell failed the 180° bend test, the second was then tested in the same manner.

Tables I and II list the antioxidants tested, the copolymer they were tested in, their concentrations in the copolymer, the inherent viscosities of the copolymers, and the days to failure of the copolymer dumbbells at 150° C. Three days to failure indicates that the first copolymer dumbbell passed the 180° bend test after 1 and 2 days at 150° C but both dumbbells failed after 3 days. A failure listing of 3–4 days indicates failure of the first dumbbell after 3 days but no failure of the second dumbbell until 4 days at 150° C. Control A which is Copolymer 1 without any stabilizer was checked on an hourly basis because of its rapid rate of failure at 150° C. Additive D of Table II is the uncopolymerizable conventional antioxidant 4,4'-bis(α,α-dimethylbenzyl)-diphenyl amine. Additive E is the uncopolymerizable conventional antioxidant N,N'-hexamethylene bis(3,5-di-tert.-butyl-4-hydroxyhydrocinnamido).

izable antioxidants do not interfere with the polycondensation reaction.

I claim:

1. An antioxidant having the structural formula:

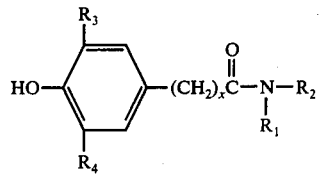

where $R_1$ is hydrogen or a lower alkyl radical; $R_2$ is a monovalent radical containing carbon, hydrogen, and oxygen, free of ethylenic or acetylenic unsaturation, and having a molecular weight between about 99–300 and, further, containing two carboxyl groups or their ester-forming equivalents; $R_3$ and $R_4$ are tertiary alkyl radicals each containing not more than 8 carbon atoms; and $x$ is an integer of from 0–4.

2. An antioxidant of claim 1 wherein $R_1$ is hydrogen.
3. An antioxidant of claim 1 wherein $R_2$ contains two

TABLE I

| | | | COPOLYMERIZABLE ANTIOXIDANTS | | | |
|---|---|---|---|---|---|---|
| Example | Copolymer | Additives | Amt. of Antioxidant added to Copolymerization (gm) | Amount Antioxidant in Copolymer (wt %) | Inherent Viscosity of Copolymer (dl/g) | Days to Copolymer Failure at 150° C |
| Control | 1 | None | 0.0 | 0 | 1.88 | 0.34 |
| 4 | 1 | A | 0.55 | 1 | 2.22 | 1 |
| 5 | 1 | A | 2.8 | 5 | 1.68 | 2–3 |
| 6 | 1 | B | 0.55 | 1 | 2.09 | 3–4 |
| 7 | 1 | B | 1.1 | 2 | 1.92 | 8 |
| 8 | 1 | C | 0.55 | 1 | 2.08 | 2–3 |
| 9 | 1 | C | 1.1 | 2 | 2.46 | 4–6 |
| 10 | 1 | C | 2.8 | 5[a] | 1.85 | 17–19 |
| Control | 2 | None | 0.0 | 0 | 1.53 | 1 |
| 11 | 2 | A | 0.55 | 1 | 1.99 | 3 |
| 12 | 2 | B | 0.55 | 1 | 1.78 | 5–6 |
| 13 | 2 | B | 1.1 | 2 | 1.73 | 12 |
| 14 | 2 | C | 0.55 | 1 | 1.83 | 6–7 |

[a]This copolymer with a small amount of carbon black/polyethylene masterbatch added for visualization purposes showed no bloom after 5 weeks at room temperature or after 5 weeks at 40–50° C.

TABLE II

| | | COPOLYMERIZABLE PLUS COMPARATIVE TEST OF UNCOPOLYMERIZABLE ANTIOXIDANTS | | |
|---|---|---|---|---|
| Example | Copolymer | Antioxidants and (wt.% in Copolymer) | Inherent Viscosity of Copolymer (dl/gm) | Days to Copolymer Failure at 150° C |
| Control | 1 | *D (0.25%) | 2.36 | 1 |
| 15 | 1 | B (1.0%) | 2.09 | 3–4 |
| 16 | 1 | *D (0.25%) + B (1.0%) | 2.01 | 7–8 |
| 17 | 1 | C (1.0%) | 2.08 | 2–3 |
| 18 | 1 | *D (0.25%) + C (1.0%) | 2.30 | 8 |
| Control | 1 | *E (0.25%) | 1.97 | 3 |
| 19 | 1 | *E (0.25%) + B (1.0%) | 1.99 | 8 |
| 20 | 1 | *E (0.25%) + C (1.0%) | 2.10 | 6–7 |

*D and E are the conventional antioxidants 4,4'bis (α,α-dimethylbenzyl)diphenylamine and N,N'-hexamethylene bis (3,5-di-tert.-butyl-4-hydroxyhydrocinnamide), respectively. It should be noted that E is employed at the highest concentration which generally avoids blooming in these copolyetheresters.

The results in Table I demonstrate that the copolymerizable antioxidants are effective in prolonging the useful life of copolyetheresters. In addition, the inherent viscosity data show that the antioxidants do not interfere with polycondensation. Table II shows that combinations of polymerizable antioxidants and conventional antioxidants are additive, and frequently more than additive, in the degree of protection provided. Table II provides additional evidence that the novel copolymerizable antioxidants do not interfere with the polycondensation reaction.

carboalkoxy groups.

4. An antioxidant of claim 1 wherein $R_3$ and $R_4$ are t-butyl.

5. An antioxidant of claim 1 wherein $x$ equals 2.

6. An antioxidant of claim 1 wherein the carbon atom in $R_2$ which is linked to the amide nitrogen is saturated.

7. An antioxidant of claim 1 having the formula:

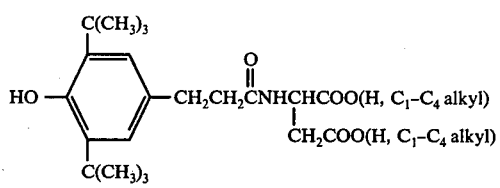

8. An antioxidant of claim 1 having the formula:

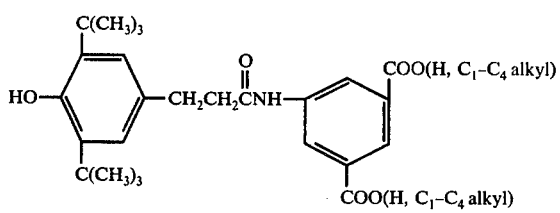

9. An antioxidant of claim 1 having the formula:

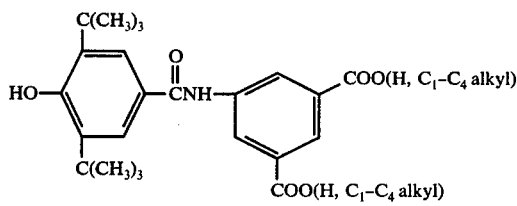

10. In a stabilized copolyetherester composition consisting essentially of a multiplicity of recurring long chain ester units and short chain ester units joined head-to-tail through ester linkages, said long chain ester units being represented by the formula

and said short chain ester units being represented by the formula

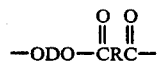

where G is a divalent radical remaining after the removal of terminal hydroxyl groups from a poly(alkylene oxide) glycol having a number average molecular weight of about 400–6000 and a carbon to oxygen atomic ratio of about 2.0–4.3; R is a divalent radical remaining after removal of carboxyl groups from a dicarboxylic acid having a molecular weight less than about 300, and D is a divalent radical remaining after removal of hydroxyl groups from a diol having a molecular weight less than about 250; provided said short chain ester units amount to about 15–95 percent by weight of said copolyetherester and characterized in that said copolyetherester is stabilized against oxidative degradation due to the presence in the backbone of the copolyetherester of an effective concentration of antioxidant units derived from:

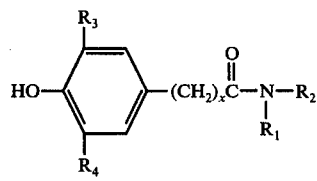

where $R_1$ is hydrogen or a lower alkyl radical; $R_2$ is a monovalent radical containing carbon, hydrogen, and oxygen, free of ethylenic or acetylenic unsaturation, and having a molecular weight between about 99–300 and, further, containing two carboxyl groups or their ester-forming equivalents; $R_3$ and $R_4$ are tertiary alkyl radicals each containing not more than 8 carbon atoms; and $x$ is an integer of from 0–4, said antioxidant units being connected to ester units in the copolyetherester through ester linkages.

11. The composition of claim 10 wherein the concentration of said antioxidant units is about 0.2–10 percent by weight based on the weight of the copolyetherester.

12. The composition of claim 10 additionally containing an uncopolymerizable antioxidant.

13. The composition of claim 12 wherein said uncopolymerizable antioxidant is an arylamine or a hindered phenol.

14. The composition of claim 10 wherein $R_1$ is hydrogen.

15. The composition of claim 10 wherein $R_2$ contains two carboalkoxy groups.

16. The composition of claim 10 wherein $R_3$ and $R_4$ are t-butyl.

17. The composition of claim 10 wherein $x$ equals 2.

18. The composition of claim 10 wherein the carbon atom in $R_2$ which is linked to the amide nitrogen is saturated.

19. The composition of claim 10 wherein said antioxidant has the formula:

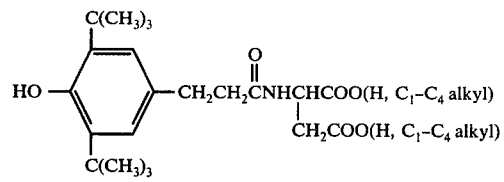

20. The composition of claim 10 wherein said antioxidant has the formula:

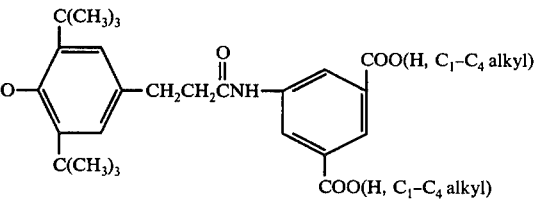

21. The composition of claim 10 wherein said antioxidant has the formula:

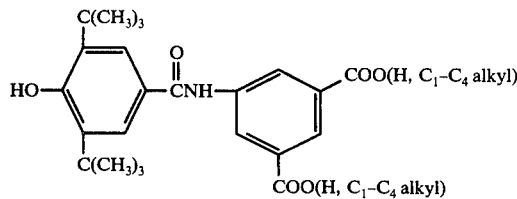

22. The composition of claim 10 wherein said poly(alkylene oxide) glycol is poly(tetramethylene oxide) glycol having a number average molecular weight of 600–2000, the diol is 1,4-butanediol and the dicarboxylic acid is terephthalic acid containing up to 30 mole % isophthalic or phthalic acid.

23. A process for producing the composition of claim 10 which comprises reacting said poly(alkylene oxide) glycol, said dicarboxylic acid and said diol in the presence of a copolymerizable antioxidant having the formula:

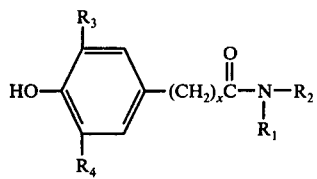

where $R_1$ is hydrogen or a lower alkyl radical; $R_2$ is a monovalent radical containing carbon, hydrogen, and oxygen, free of ethylenic or acetylenic unsaturation, and having a molecular weight between about 99–300 and, further, containing two carboxyl groups or their ester-forming equivalents; $R_3$ and $R_4$ are tertiary alkyl groups each containing not more than 8 carbon atoms; and $x$ is an integer of from 0–4.

24. The process of claim 23 wherein said antioxidant is added in amounts of about 0.2–10 percent by weight based on the weight of the copolyetherester.

25. The process of claim 23 wherein $R_1$ is hydrogen.

26. The process of claim 23 wherein $R_2$ contains two carboalkoxy groups.

27. The process of claim 23 wherein $R_3$ and $R_4$ are t-butyl.

28. The process of claim 23 wherein $x$ equals 2.

29. The process of claim 23 wherein the carbon atom in $R_2$ which is linked to the amide nitrogen is saturated.

* * * * *